COMPUTER WITH COMPATIBLE MULTIPLICATION AND DIVISION

Filed July 22, 1964 7 Sheets-Sheet 1

INVENTORS
STANLEY H. PITKOWSKY
JAMES H. SHELLY

BY Robert W. Berray
ATTORNEY

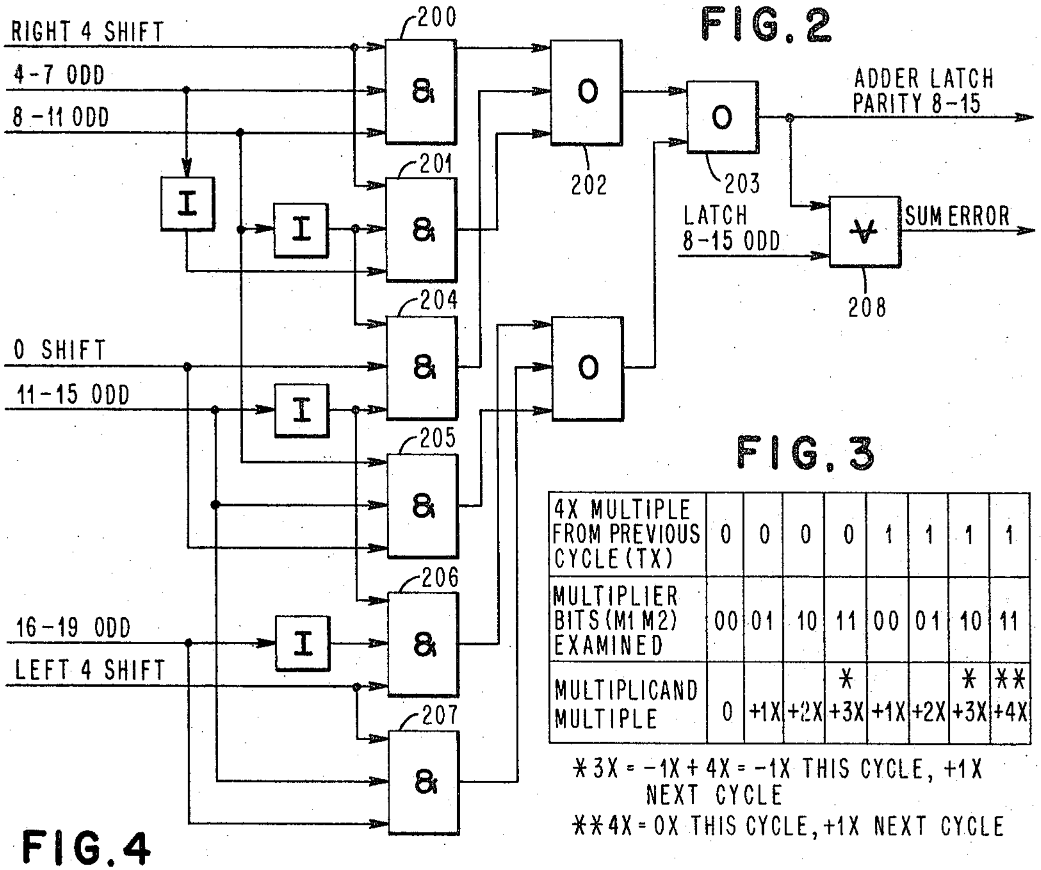

FIG. 2, FIG. 3

| 4X MULTIPLE FROM PREVIOUS CYCLE (TX) | 0 | 0 | 0 | 0 | 1 | 1 | 1 | 1 |
|---|---|---|---|---|---|---|---|---|
| MULTIPLIER BITS (M1 M2) EXAMINED | 00 | 01 | 10 | 11 | 00 | 01 | 10 | 11 |
| MULTIPLICAND MULTIPLE | 0 | +1X | +2X | * +3X | +1X | +2X | * +3X | ** +4X |

*3X = -1X + 4X = -1X THIS CYCLE, +1X NEXT CYCLE
**4X = 0X THIS CYCLE, +1X NEXT CYCLE

FIG. 4

| HIGH ORDER BITS OF DIVISOR | HIGH ORDER BITS OF REMAINDER | B 32 33 34 | POSSIBLE QUOTIENT HI LO | DIVISOR MULTIPLE SELECTED | REMAINDER SHIFT |
|---|---|---|---|---|---|
| T32 33<br>1 0 | TRUE | 0 0 0 | 0 0 | 0X | L2 |
| | | 0 0 1 | 0- | -1X | L2 |
| | | 0 1 0 | 01 OR 10 | -2X | L2 |
| | | 0 1 1 | 1- | -2X<br>-1X IF REM TRUE HI ORDER 1 | L2, THEN 0 |
| | COMP | 1 0 0 | 0- | +2X<br>+1X IF REM COMP HI ORDER 0 | L2, THEN 0 |
| | | 1 0 1 | 01 OR 10 | +2X | L2 |
| | | 1 1 0 | 1- | +1X | L2 |
| | | 1 1 1 | 11 | 0X | L2 |
| 1 1 | TRUE | 0 0 0 | 0 0 | 0X | L2 |
| | | 0 0 1 | 0- | -1X | L2 |
| | | 0 1 0 | 01 | -2X<br>+1X IF REM COMP HI ORDER 0 | L2, THEN 0 |
| | | 0 1 1 | 01 OR 10 | -2X | L2 |
| | COMP | 1 0 0 | 01 OR 10 | +2X | L2 |
| | | 1 0 1 | 10 | +2X<br>-1X IF REM TRUE HI ORDER 1 | L2, THEN 0 |
| | | 1 1 0 | 1- | +1X | L2 |
| | | 1 1 1 | 11 | 0X | L2 |

Dec. 20, 1966 S. H. PITKOWSKY ET AL 3,293,420

COMPUTER WITH COMPATIBLE MULTIPLICATION AND DIVISION

Filed July 22, 1964 7 Sheets-Sheet 3

COMPUTER WITH COMPATIBLE MULTIPLICATION AND DIVISION

Filed July 22, 1964 7 Sheets-Sheet 5

| CYCLE | 1 | 2 | 3 | 4 | 5 | 6 | 7 | 8 |
|---|---|---|---|---|---|---|---|---|
| SELECT X | $\overline{OX}$/S30,31 | OX/S28,29 | $\overline{OX}$/S24,25 | $\overline{OX}$/S22,23 | $\overline{OX}$/S20-21 | OX/S18-19 | $\overline{OX}$/S14-15 | $\overline{OX}$/S12-13 |
| STEP R2 | 15(11) -1 14 | (10) -2 12 | (00) -1 11 | (11) -1 10 | (10) -1 9 | (01) -2 7 | (11) -1 6 | (10) |
| ADD | | L2/S30,31 | L0/S26,27 | L2/S24,25 | L2/S22,23 | L2/S20-21 | L0/S16,17 | L2/S14,15 |
| STORE PROD. | | | B64-67 | B66,67 | B66,67 F2-7 | B66,67 | B64-67 | B66,67 F2-7 |
| | | | F4,5,6,7 | F2,3 | S24-31 | F6,7 | F2,3,4,5 | S16-23 |

Dec. 20, 1966 S. H. PITKOWSKY ET AL 3,293,420

COMPUTER WITH COMPATIBLE MULTIPLICATION AND DIVISION

Filed July 22, 1964 7 Sheets-Sheet 6

United States Patent Office 3,293,420
Patented Dec. 20, 1966

3,293,420
COMPUTER WITH COMPATIBLE MULTIPLICATION AND DIVISION
Stanley H. Pitkowsky and James H. Shelly, Poughkeepsie, N.Y., assignors to International Business Machines Corporation, New York, N.Y., a corporation of New York
Filed July 22, 1964, Ser. No. 384,362
11 Claims. (Cl. 235—164)

This invention relates to a data processing system organization and more particularly to a data processing system data path which provides compatibility between multiplication and division for generating a plurality of product bits or quotient bits during each cycle of operation.

Binary multiplication and division have progressed through the prior art along separate paths from the point where single product or quotient bits are generated for each iterative cycle to the point where a plurality of product or quotient bits can be generated on each cycle of a multiplication or division process. The progression of binary division in data processing machines is well outlined in application Serial No. 162,503 filed December 27, 1961, now Patent Number 3,223,831, entitled "Binary Division Apparatus" by Charles R. Holleran, assigned to International Business Machines Corporation. This application discloses an algorithm for division which is capable of generating a plurality of quotient bits for each iterative cycle during the binary division process. U.S. Patent 3,069,085, issued December 18, 1962, for a Binary Digital Multiplier by R. A. Coopper et al., assigned to International Business Machines Corporation, discloses a multiply algorithm which is capable of examining a plurality of multiplier bits on each cycle to thereby generate a plurality of product bits. Both of these references utilize during an iterative add cycle multiples of a multiplicand or divisor which will be added or subtracted from a partial product or dividend-remainder. When these two references are examined, it can be seen that in the case of division, a register for retaining a dividend-remainder must be provided capable of being shifted to the left. In the case of multiplication, a register for retaining a partial product must be provided for shifting to the right.

It is an object of this invention to provide a data processing system organization which provides a data path compatible for both multiplication and division.

It is also an object of this invention to provide a compatible data path for multiplication and division in which operands can be manipulated without shift registers.

If parity checking of shifted operands is to be accomplished in the above cited references, parity checking circuitry must be provided at each register to adjust or check parity after every shift operation. Application Serial No. 290,486, filed June 25, 1963, entitled "Arithmetic Checking Apparatus" by Stanley H. Pitkowsky et al., assigned to International Business Machines Corporation, discloses an adder which can provide parity checking at its input even though operands presented at the input have been shifted relative to parity bits associated with bit groups. Further, the adder output can be parity checked based on the original operands which have been shifted into the adder for generating a sum.

It is another object of this invention to provide a compatible data path for multiplication and division through an adder which has means for shifting the output of the adder during the transfer of data from the adder to registers accompanied with means for adjusting the final sum parity bits for bit groups which have been shifted such that separate parity checking and generating means are not required for each register which is to contain shifted data.

Both of the above references also show that when operands are to be shifted, a separate shift cycle must be accommodated.

It is a further object of this invention to provide a compatible data path for multiplication and division wherein the normal transfer of operands required for accomplishing addition or subtraction during the multiplication or division process is accompanied with a simultaneous shifting of data such that no time is required merely for a shifting operation.

In the above-identified application Serial No. 162,503, division is accomplished and multiple quotient bits generated as a result of providing a three times multiple of the divisor. A separate register is required to retain the three times multiple which must be generated prior to commencing the divide operation.

It is another object of this invention to provide a common data path for multiplication and division wherein a reduction in apparatus is realized for a divide operation.

In the above-identified Patent 3,069,085, the multiplication technique shows the ability to generate two product bits per iterative add cycle by decoding two multiplier bits for the purpose of adding or subtracting multiples of a multiplicand in relation to a partial product.

It is a further object of this invention to provide a compatible data path for multiplication and division wherein the multiply operation can be accomplished at a faster rate as a result of the common path.

The above recited objects are realized in a binary data processing machine having a data path which includes as a basic item, a multi-digit adder. The adder is capable of parity checking operands to be added even though the operands are shifted in relation to originally generated parity bits. One input to the parallel adder is from a first register which, during multiplication contains a multiplicand and, during division contains a divisor. The contents of the first register are transferred to the adder through a series of gates capable of transferring the contents of the first register with a zero shift or a shift of 1 bit position to the left and true or complement gates. This permits addition or subtraction of a one times multiple or two times multiple of either a multiplicand or divisor. The second input to the parallel adder is from a second register which, during multiplication will contain a partial product and, during division will contain a dividend or dividend-remainder. The coupling between the second register and the adder includes a series of gates which permit the transfer of the contents of the second register to the adder with a zero shift or a shift of 2 bit positions to the left. During multiplication, the output of the parallel adder is shifted 4 bit positions to the right before being transferred back to the second register.

During multiply, the normal operation is to add or subtract a multiple of the multiplicand to the partial product and transfer the result from the parallel adder to the second register shifted 4 bit positions to the right. During the next iterative add cycle, the partial product is shifted left 2 bit positions for entry into the adder. This has the net effect of shifting the partial product 2 bit positions to the right in accordance with the basic principle of generating two product bits per iterative add cycle as a result of having examined two multiplier bits during each iterative cycle. Having a basic right 4 shift and left 2 shift of the partial product, the invention utilizes the right 4 shift of the partial product whenever possible. The left 2 shift of the partial product can be inhibited in cases where an examination of multiplier bits reveals that a zero times multiple is selected. In this case, the right 4 shift is retained and two succeeding multiplier bits are utilized for multiple selection which, in effect, enables certain multiplier bit combinations to be examined 4 bits at a time instead of the normal 2 bits at a time.

During divide operations, the first register containing the divisor, will be transferred to the adder with a zero shift or 1 bit position to the left, either in true or complement form to be added to a dividend-remainder contained in the second register which is normally shifted 2 bit positions to the left during transfer to the adder. A shift of 2 bit positions to the left of a dividend-remainder is normal when two quotient bits are to be developed for each iterative add cycle. In certain instances, the zero shift gates from the second register are utilized. During certain iterative cycles of the divide process, when a three times multiple of the divisor is required, the results of the addition of the divisor multiple and partial remainder may not provide a conclusive result for generation of the two quotient bits. In these cases, an extra cycle must be taken to accomplish a second addition of the divisor and the inconclusive remainder wherein the remainder is transferred to the adder through the zero shift gates.

It can thus be seen, that the data path of the preferred embodiment of the invention permits the same set of gates coupling the first register to the adder to be utilized for the generation of multiples of a divisor or multiplicand with the ability to add or subtract these multiples. The same set of gates which couple the second register to the adder are utilized in a multiply operation to produce a normal right 2 shift of the partial product and in a divide operation to produce a normal left 2 shift of a dividend-remainder.

It can also be seen that by providing a shift out of the adder of 4 bit positions to the left as well as 4 bit positions to the right, wherein the shifted adder output can be transferred to either the first or second registers, any combination of operand shifts can be accomplished. Further, by providing the parallel adder with parity checking capabilities of bit shifted operands, even the shifting of single operands through the adder can be parity checked and the parity adjusted at the adder output for any shifts which have occurred. Therefore, all shifting of data can be parity checked with one set of parity checking apparatus without the need for a plurality of shift registers or associated parity apparatus.

The foregoing and other objects, features and advantages of the invention will be apparent from the following more particular description of the preferred embodiment of the invention, as illustrated in the accompanying drawings.

In the drawings:

FIGURE 2 is a block diagram showing the manner in which parity bits are adjusted for the shifting of data bits out of a parallel adder.

FIGURE 3 is a table illustrating the rules for accomplishing multiplication.

FIGURE 4 is a table illustrating the rules for accomplishing division.

*Data path*

Figure 1:
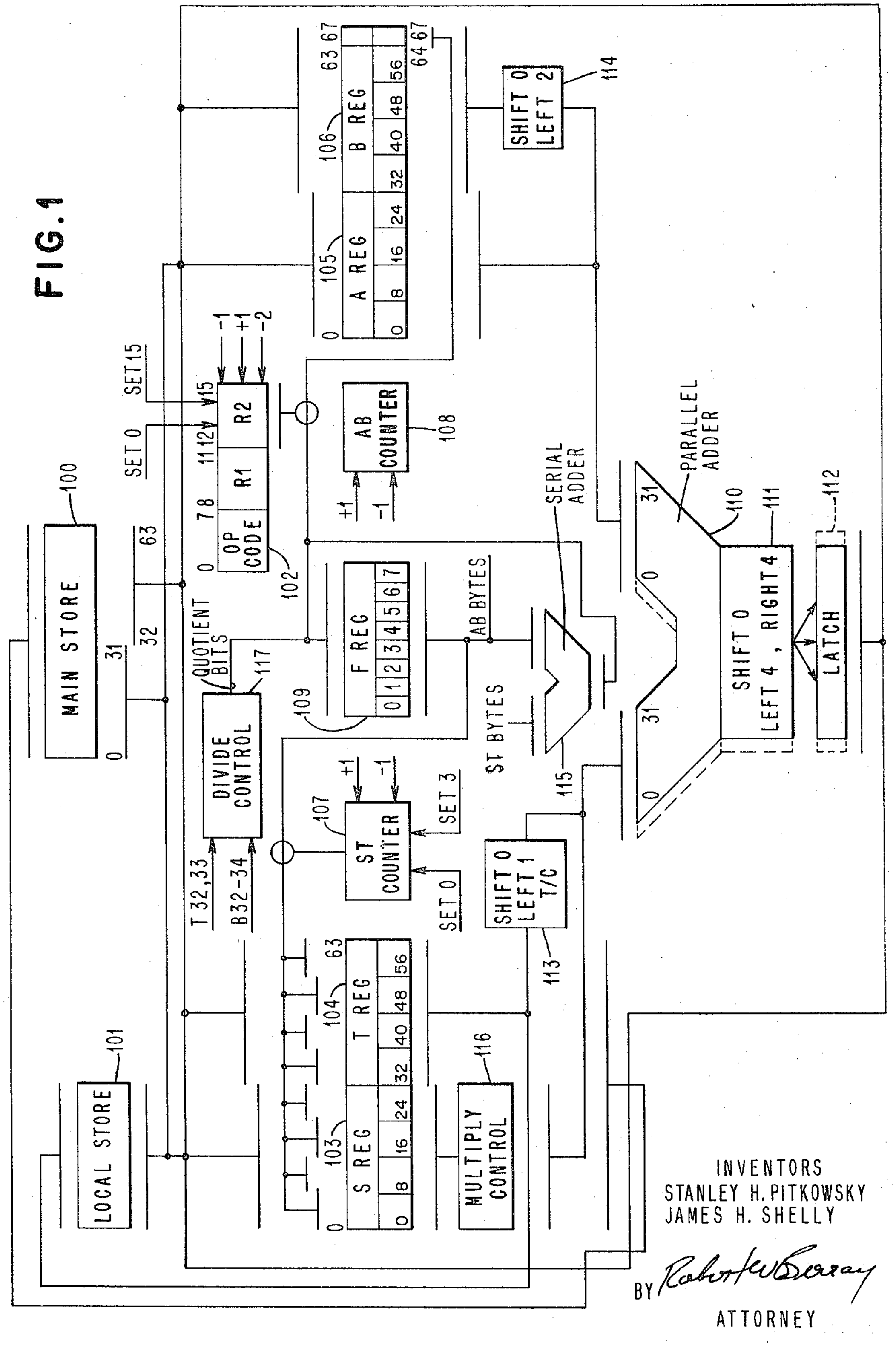
FIGURE 1 is a block diagram showing a data processing system incorporating the invention.

The data path required for performing multiplication and division in a preferred embodiment of this invention is shown in FIGURE 1. The basic word size in the preferred embodiment is 32 binary bits. The 32 binary bits are divided into groups of bits which will be referred to as bytes, each consisting of 8 binary bits. Therefore, each basic word will contain 4 groups or bytes of 8 bits each. Although not shown in the representation of FIGURE 1, each 8-bit byte will have associated therewith a parity bit for purposes of error detection. The registers and data paths shown only refer to the data bits and do not show parity bits.

Operands to be utilized in the operation of the data processing system may be contained in either a main store 100 or a local store 101. The main store 100 is an addressable core storage which can provide, on selected output buses, 64 data bits or selectively 32 data bits. The local store 101 is an addressable store which is comprised of a plurality of registers. Each of these registers are 32 data bits long. Operations to be performed by the data processing system are indicated by instructions obtained from the main store 100. One form of instruction utilized in a preferred embodiment of this invention consists of 16 bits which are inserted into a register 102. Bits 0–7 of the instruction will contain an operation code such as multiply or divide. This instruction contains two 4-bit addresses R1 and R2 which provide access to operands in the local store 101. Once access has been made to the local store 101, bits 12–15 in register 102 will be utilized as a counter for indicating the progress of multiply and divide operations. During a multiply operation, the R2 bits will be set to the equivalent of a count of 15 and for a divide operation will be set to the equivalent of 0. During multiply, the R2 counter will be stepped down, or decremented, by either one or two counts. During divide, the R2 counter will be stepped up by one increment.

Operands for the performance of various operations within the data processing system may be transferred from either the main store 100 or local store 101 selectively to a plurality of 32-bit registers. For certain operations, such as multiply and divide, these registers can be considered individual registers and are identified as an S register 103, T register 104, A register 105, and B register 106. For certain operations, not pertinent to the instant invention, the registers may be considered linked together to provide the ability to manipulate double length operands. The B register 106 contains 4 extra bit positions 64–67 which are utilized during multiply for transferring product bits when generated.

Associated with the registers 103 and 104 is a three position ST counter 107 which can be incremented or decremented by a count of 1. The ST counter 107 identifies a particular one of the eight 8-bit bytes in the ST registers 103 and 104. The identification of a particular 8-bit byte by the ST counter 107 permits selective gating of an 8-bit byte into or out of the S and T registers. During multiply, the S register 103 contains the multiplier. As indicated previously, the multiply algorithm calls for the decoding of two multiplier bits and starts at the low order bits of the multiplier. A multiply operation requires 16 iterative additions and these 16 additions are accounted for by decrementing the R2 counter in register 102. Since two multiplier bits are examined per cycle, and the R2 counter bits 14 and 15 repeat themselves every 4 cycles, a combination of bits 14 and 15 in counter R2 plus the condition of the R2 counter positions 12–13 will identify a particular pair of multiplier bits in the S register 103. The particular pair of multiplier bits identified are utilized to select multiples of a multiplicand during the multiply operation. The setting of the ST counter 107 is utilized during multiply and divide for gating 8-bit bytes of either product or quotient bits into particular byte positions of the S register.

Although not required in the instant invention, a preferred embodiment of a total data processing system data path also includes an AB counter 108 used for gating 8-bit bytes into and out of the AB registers 105 and 106.

A further register in the basic data path is an F register 109 which has 8 bit positions and is utilized during multiply to accumulate an 8-bit byte of product and during divide to accumulate an 8-bit byte of quotient. The ingating of 2 bits of quotient or product into the F register 109 is also controlled by the R2 counter in register 102 which can identify bit pairs in the F register in accordance with positions 14 and 15 of the R2 counter. As indicated previously, when an 8-bit byte of product or quotient has been developed in the F register 109, the 8-bit byte is transferred to the S register under control of the contents of the ST counter 107.

Also in the basic data path, is a parallel adder 110. The adder 110 in FIGURE 1 is depicted as having stages equivalent to a basic 32-bit operand plus additional stages for adding operands which have been shifted to the left. For both multiply and divide, to be described later, the adder need only accommodate 32-bit operands, however, it will be clear to those skilled in the art that the number of stages provided in the parallel adder can be increased to accommodate larger sized operands such as double length or 64-bit operands. The adder 110 is disclosed in the above-identified application Serial No. 290,486. In the preferred embodiment of the invention, the adder 110 output is presented to a series of gates 111 which can be selectively energized to cause the adder output to be shifted 4 bit positions to the left or right or with a zero shift. The adder output which has been shifted or not is then temporarily stored in latch circuits 112 before being selectively transferred back to registers 103, 104, 105, or 106. The above-identified application Serial No. 290,486 discloses how the results of the adder 110 output can be parity checked based on groups of 4 data bits. To be more fully explained later in connection with FIGURE 2, means are provided for adjusting the parity of the 4 bit groups, if shifted left or right 4 bit positions, to generate a proper parity for an 8-bit byte in the latches 112 prior to transfer back to a selected register.

During both multiply and divide, the multiplicand and divisor are transferred to the adder 110 with either a 0 shift or a shift of 1 bit position to the left to thereby permit the addition of a one times or two times multiple. Also, as indicated previously, the multiple of the multiplicand or divisor can be added or subtracted in the adder and this is accomplished by providing true or complement gates into the adder. The gates for transferring data from the T register 104 which will contain a divisor or multiplicand, are depicted schematically at 113.

Between the B register 106 and the adder 110, there is depicted gating means 114 by which an operand in the B register 106 can be transferred to corresponding stages of the parallel adder 110 or shifted left 2 bit positions. During multiply, the combination of a right 4 shift out of the adder 110 to the B register 106 followed by a left 2 shift into the adder 110 from the B register 106 accomplishes an effective right 2 shift of a partial product. This is in accordance with well known multiplying techniques wherein two multiplier bits are examined for each iterative addition. During divide, a dividend-remainder from the parallel adder 110 is sent to corresponding stages in the B register 106 followed normally by a left 2 shift into the parallel adder 110 on the next iterative addition to thereby accomplish the well known left 2 shift of a dividend-remainder during the generation of 2 quotient bits per iterative addition.

Although not germane to the instant invention, there is also shown in FIGURE 1 a serial adder 115 which is actually an 8-bit parallel adder. This 8-bit adder 115 can be utilized in other operations of the data processing system for accomplishing addition, subtraction, or logical operations on 8-bit bytes gated to the adder 115 from the various registers in accordance with the byte indications from either the ST counter 107 or the AB counter 108.

Depicted generally in FIGURE 1 is a multiply control 116. The multiply control 116 controls selective gating of register contents into the adder 110 and gating out of the adder 110 to the registers in accordance with detection of a pair of multiplier bits from the S register 103. The multiply control 116 also controls the transfer of final product bits from position 64–67 of the B register 106 for accumulation in the F register 109 and further for transfer of 8-bit bytes from the F register 109 to particular bytes of the S register 103.

Also depicted generally in FIGURE 1, is a divide control 117 which, as indicated, provides two quotient bits for accumulation in the F register 109 in accordance with various logic operations essentially initiated by two high order bits of a divisor contained in positions 32 and 33 of the T register 104 and the three high order bits 32–34 of a dividend-remainder contained in the B register 106.

Before proceeding with a detailed description of the following figures, an explanation of the logic utilized will be given. Positive logic is utilized throughout the figures. This means that when a particular control line is in a positive condition, the logic associated therewith will be in a true state. Certain control lines will be positive when the associated logic is not in a true condition. In these situations a symbol comprised of a solid line above the logic condition indicates that the logic is not true. In an AND circuit, all inputs must be positive to achieve a positive output. In an OR circuit, if any one input is positive the output will be positive. In an Exclusive-OR circuit, only one of the inputs may be positive to achieve a positive output. Certain control lines are caused to be inverted through inverters wherein the polarity of the input is reversed at the output.

*Parity adjusting*

FIGURE 2 depicts the logic required to adjust parities at the output of the parallel adder 110 of FIGURE 1 in response to a shifting of data bits by 4 bit positions. The adder disclosed in the above-mentioned application Serial No. 290,486 shows the generation of parities for each of a group of 4 data bits at the output of the adder. FIGURE 2 shows logic which is required for generating a correct parity in the latches 112 for an 8-bit byte comprised of bits 8 through 15 in the latch 112 may be combinations of the parities for bits 4–7, 8–11, 11–15, or 16–19. When the output of the adder 110 is subjected to a right 4 shift, a pair of AND circuits 200 and 201 will be enabled to provide an output through OR circuits 202 and 203 which combine the even-odd condition of the adder output for bits 4–7 and 8–11 to ultimately generate the parity for the latch bits 8–15. In a like manner, a pair of AND circuits 204 and 205 will be enabled to indicate the even-odd condition of adder outputs for bit positions 8–11 and 11–15 when the adder output is subjected to a zero shift condition. When the adder output is subjected to a left four shift, the adder output for bit positions 11–15 and 16–19 will be utilized to ultimately generate the parity for the latch bits 8–15 and this is indicated by a pair of AND circuits 206 and 207. When the parities of the adjacent group of 4 bits of the adder output have been combined in accordance with the shifting to generate the latch parity for bits 8–15, the actual data condition of latch positions 8–15 after the shift are compared with the adjusted parity in an Exclusive-OR circuit 208 to provide a sum error output indicating a parity error which can be utilized for any necessary error correcting routines.

*Multiply algorithm*

FIGURE 3 is a table showing the multiply algorithm which is essentially the same as that shown in the above-mentioned U.S. Patent No. 3,069,085. Two multiplier bits M1, M2 are examined on each cycle to direct the selection of a multiplicand multiple to be added to or subtracted from a partial product. The designation in the table of "4× multiple from previous cycle (T×)" indicates those conditions in which a carry of 1 must be added to the next succeeding two multiplier bits. These situations arise whenever a multiple selection calls for a three times or four times multiple. Since a three times multiple is not provided in the preferred embodiment, the equivalent of a three times multiple can be achieved by subtracting a one times multiple of the multiplicand on the instant cycle followed by the addition of a one times multiple on the following cycle. This is accomplished through the use of the T× indication which in effect adds a binary 1 to the binary condition of the two following multiplier bits. A four times multiple is selected in accordance with the combination shown in the last column of the table, and is accomplished by causing a shift of a partial product in the instant cycle followed by a plus one times multiple on the following cycle. This again is achieved by, in effect, adding a binary 1 to the following two multiplier bits.

It is the object of the present invention, to be more fully explained later, to provide a special indication of the selection of a zero times multiple (0×) which can occur as shown in the first and the last column of the table. In these special conditions, the normal right 4 shift out of the parallel adder 110 into the B register 106 of FIGURE 1 will not be followed by a left 2 shift into the adder. The right 4 shift will be retained and the multiplicand multiple selection for addition to the partial product will be made based on two succeeding multiplier bits. This provides a speed-up of the multiply operation which would normally require a separate cycle for merely a shift operation across binary 0's or across binary 1's. In other words, a multiply iterative addition is accomplished based on 4 multiplier bits instead of the normal 2 multiplier bits.

*Division algorithm*

The division algorithm depicted in the table of FIGURE 4 is again essentially the same as that shown in application Serial No. 162,503. This algorithm permits the generation of two quotient bits based on a decoding of the three high order bits of a dividend-remainder and the two high order bits of a divisor. The table of FIGURE 4 is essentially the same as the tables shown in the above-identified application with the exception that in the instant invention, the need for a three times divisor multiple has been eliminated. As indicated in the table, to accommodate the lack of a three times multiple, certain conditions are decoded to indicate that before a pair of quotient bits can be generated, a two times multiple of the divisor must be added or subtracted from a partial dividend-remainder followed by an extra cycle of addition to provide a conclusive indication from the results of the addition to thereby generate the quotient bits. As indicated previously, this is accomplished by always initiating an addition cycle in the iterative process of division by causing the dividend-remainder to be shifted left 2 bit positions from the B register 106 to the parallel adder 110. In the special cases which require an additional cycle to provide a conclusive result, the zero shift gates from the B register 106 to the adder 110 are enabled. As seen in connection with the column headed "Possible Quotient," the high order quotient bit of a pair can always be determined merely by an examination of the true or complement status of a previous remainder in combination with multiple selection of the divisor. The low order quotient bit of the pair, at times, can be determined immediately from the initial decoding but at other times must await determination of the results of the addition of the divisor multiple and dividend-remainder. The determination of the low order quotient bit is primarily a function of the presence or absence of a carry out of the adder position 0. When a carry out of position 0 of the adder indicates that the results of the addition of a two times multiple should indicate a true number, the result is inconclusive because the highest order bit of the result is a binary 1 and is not compatible with the decoding scheme utilized. This condition initiates the extra cycle required.

*Multiplier bit selection*

Figure 5:
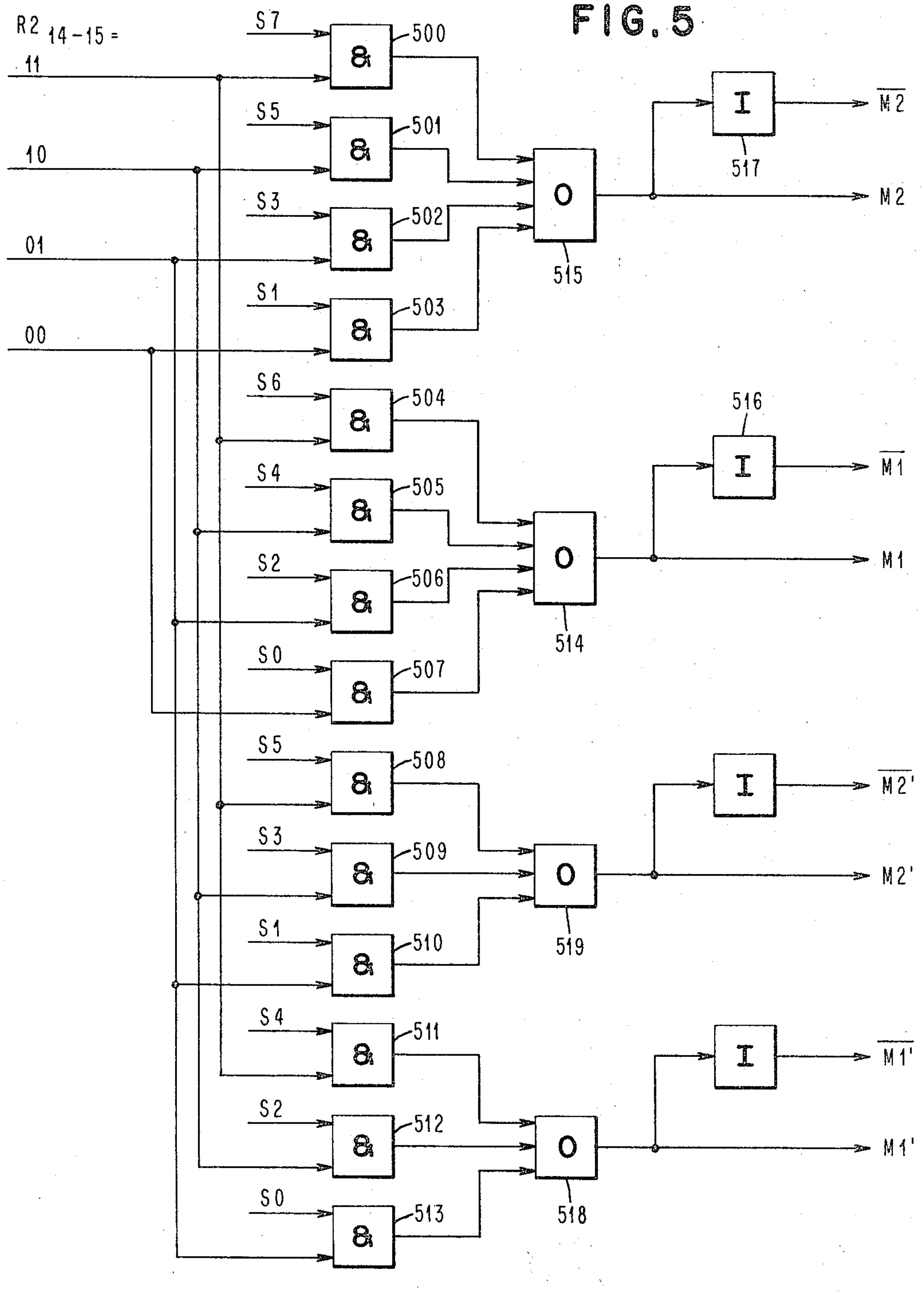
FIGURE 5 is a block diagram showing the logic required for selecting a plurality of multiplier bits for decoding during multiplication.

FIGURE 5 shows the logic for selecting pairs of multiplier bits from a particular one of the 8-bit bytes from the S register 103. The selection of pairs of multiplier bits is accomplished by the condition of positions 14 and 15 of the R2 counter. In FIGURE 5, the bits S0 through S7 from the particular byte of the S register provide one input to a series of AND circuits 500 through 513. Pairs of the AND circuits 500 through 513 will be sampled in sequence by the count condition of positions 14 and 15 of the R2 counter. The high order bit of a multiplier pair (M1) will be generated through an OR circuit 514 and the low order multiplier bit of the bit pair (M2) will be generated from an OR circuit 515. The M1 and M2 outputs will be positive when the sampled multiplier bit is a binary 1. Inverters 516 and 517 will provide a positive output whenever the sampled multiplier bits are binary 0 and are indicated by the output $\overline{M1}$ or $\overline{M2}$.

As indicated earlier, it is an object of this invention to provide a multiply speed-up by detecting when the multiplier bits M1–M2 indicate the selection of a 0 multiple of the multiplicand to thereby enable multiple selection to be based on the next two succeeding multiplier bits. The outputs M1′ from an OR circuit 518 and M2′ from an OR circuit 519 will be enabled for utilization in multiple selection when a 0 multiple has been selected by the previous two multiplier bits. It can be seen in FIGURE 5, that when the R2 counter positions 14 and 15 are in the 11 state, M1 and M2 provide the indication of the binary condition of multiplier bits S6 and S7. For the same count state of counter R2, the M1′ and M2′ outputs will be energized in accordance with the binary condition of multiplier bits S4 and S5.

In a preferred embodiment of the invention, although not described, the particular byte of the S register 103 being indicated by the R2 counter positions 12–13 was gated in an 8-bit (a byte) group for sequential sampling by the R2 counter positions 14–15. In this case, when the R2 counter bit positions 14 and 15 were in the 00 combination, the next two multiplier bits from the following byte were not available for decoding. When the R2 counter positions 14 and 15 are in the 00 combination only the M1 and M2 outputs are generated and 0 multiple selection with skipping to the next succeeding multiplier bit pair is not permitted. In another embodiment of the invention, it is not necessary to gate the particular S register byte to a register, however, sufficient gating was not provided between the R2 counter positions 12–13 and 14–15 in register 102 to identify the two multiplier bits in the next succeeding multiplier byte. The prohibition against allowing skipping for the R2 counter content 00 in positions 14–15 could be removed by providing sufficient gating to enable skipping across byte boundaries into the next succeeding multiplier byte.

*Zero multiple selection*

Figure 6:
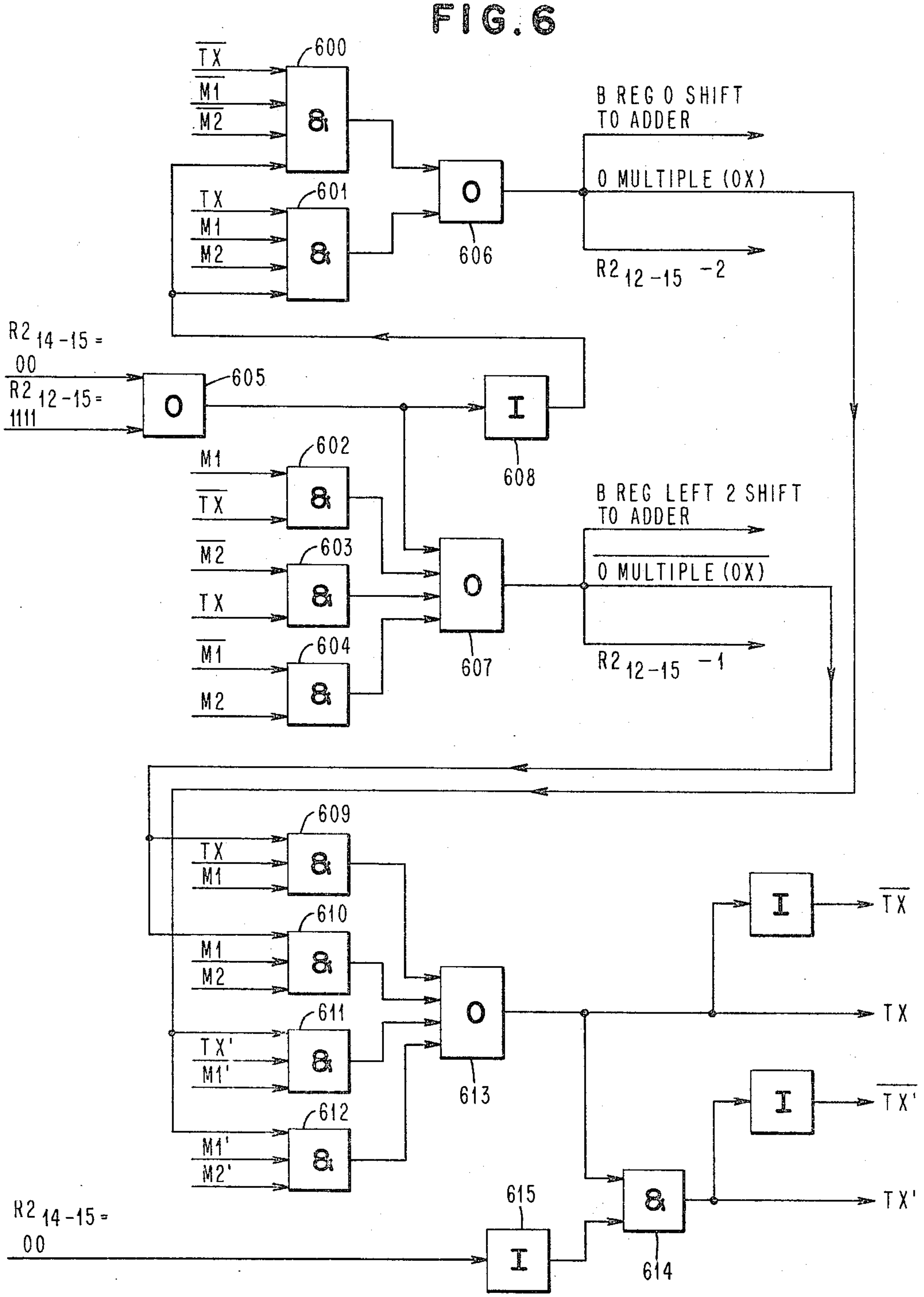
FIGURE 6 is a block diagram of logic required to generate certain controls in accordance with the table shown in FIGURE 3.

In FIGURE 6, AND circuits 600 through 604, OR circuits 605, 606, and 607 and inverter 608 provide the necessary logic for combining multiplier bit pairs M1 and M2 with the four times multiple carry indication T× for defining the conditions which indicate that a 0 multiple (0×) is to be selected or that the multiple selection is not a 0 multiple ($\overline{0\times}$). When a 0 multiple condition has been indicated by the multiplier bits M1 and M2, an output will be generated to the coupling gates between the B register 106 and the parallel adder 110 in FIGURE 1 to cause the partial product in the B register to be transferred to the adder with a 0 shift. Partial product transferred to the parallel adder 110 with a 0 shift will then be added to a multiple of the multiplicand in the T register 104 which has been selected by the next two succeeding multiplier bits M1′ and M2′. Since for a particular iterative add cycle calling for a 0 multiple, four multiplier bits will have been used in the cycle, the R2 counter in FIGURE 1 will be decremented by two to cause multiple selection on the following cycle to be made by the proper pair of multiplier bits. Whenever the multiple selection based on multiplier bits M1 and M2 calls for a multiple other than a 0 multiple ($\overline{0\times}$), the partial product in the B register 106 will be shifted 2 bit positions to the left into the parallel adder 110 to provide the normal partial product shift of right 2 since the partial product had previously been entered into the B register 106 from the parallel adder latch 112 with a 4 bit position shift to the right. Since only two multiplier bits have been utilized in this particular iterative add cycle, the R2 counter is decremented by 1 to thereby permit multiple selection on the following cycle to be made by the two suceeding multiplier bits.

OR circuit 605 and inverter 608 are utilized to inhibit 0 multiple selection by multiplier bits S0 and S1 in a particular multiplier byte because of the reasons set forth above. Further, on the initial multiply add cycle, when the R2 counter is in the condition shown at OR circuit 65, 0 multiple selection is prevented because the necessary product bits have not yet been generated for transferring to the F register 109 of FIGURE 1. This will be seen later in connection with a discussion of FIGURE 9 which shows that the first product bits for transferring to the F register will not be available until three cycles after the initial multiple selection.

As shown in the table of FIGURE 3, one indication which must be made for multiple selection is an indication that a carry of a one times multiple must be made in a succeeding cycle to accomplish three times multiple and four times multiple selection. This indication (T×) is provided by the logic including AND circuits 609 through 612, and OR circuit 613. The logic shown therein is capable of accomplishing an indication of T× or $\overline{T\times}$ for use with multiplier bits M1 and M2. AND circuit 614 inhibited by an inverter 615 when the R2 counter positions 14–15 equal 00, provides the T×′ indication for use with multiplier bits M1′ and M2′.

*Multiple selection*

Figure 7:
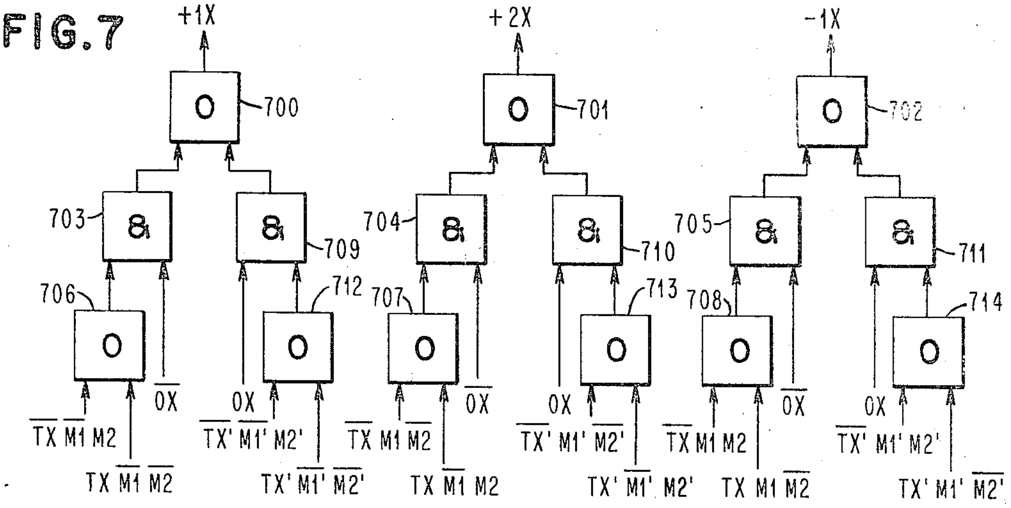
FIGURE 7 is a block diagram of logic required for decoding multiplier bits to select multiples of a multiplicand during multiplication.

FIGURE 7 shows the logic required for indicating the multiple of the multiplicand in T register 104 to be transferred to the parallel adder 110 of FIGURE 1 for addition to a partial product. The output of an OR circuit 700 indicating that a one times multiple (1×) of the multiplicand is to be added to the partial product provides the necessary control for energizing the gates between the T register 104 and the adder 110 in FIGURE 1 for causing the multiplicand in true form to be transferred to the adder with a 0 shift. OR circuit 701 which calls for a two times multiple (2×) energizes the gates between the T register 104 and the parallel adder 110 to cause the multiplicand in the T register to be transferred to the parallel adder with a shift left of 1 position which effects a multiplication of the multiplicand by 2. OR circuit 702 indicates that the multiplicand is to be subtracted from a partial product. The minus one times multiple (−1×) is transferred to the parallel adder by energizing the gates 113 between the T register 104 and adder 110 to complement the multiplicand and transfer the complement to the adder with a shift of 0.

When the logic of FIGURE 6 decodes multiplier bits M1, M2 indicating that the multiple to be selected is not a 0 multiple ($\overline{0\times}$), AND circuits 703, 704, and 705, in FIGURE 7 will be enabled. In this case, the binary 1 or binary 0 condition of the T× from FIGURE 6 and multiplier bits M1, M2 generated from FIGURE 5 will be effective at OR circuits 706, 707, and 708 to provide an output from the proper one of the OR circuits 700, 701, or 702. When a zero times multiple (0×) of the multiplicand has been selected by a particular pair of multiplier bits M1, M2 as indicated by the logic in FIGURE 6, AND circuits 709, 710 and 711 will be enabled. This then effects multiple selection from OR circuits 700, 701, or 702 by utilizing the next two succeeding multiplier bits M1′, M2′ and the indication T×′ generated from FIGURES 5 and 6 respectively. The logical combination of T×′, M1′ and M2′ are provided as inputs to OR circuits 712, 713, and 714.

*Product accumulation*

Figures 8, 9:
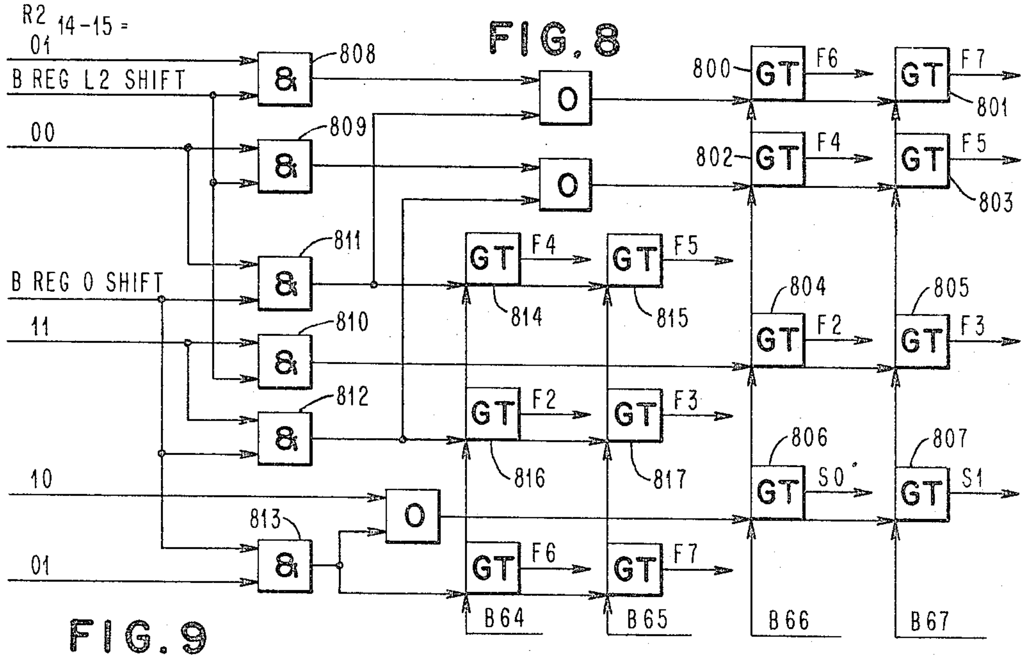
FIGURE 8 is a block diagram of logic required for accumulating bits of a product during multiplication.
FIGURE 9 is a timing chart illustrating cycles in which various control functions depicted in FIGURES 5 through 8 are performed.

FIGURE 8 discloses the logic by which product bits contained in B register 106 of FIGURE 1 are transferred to the F register 109 for accumulating an 8-bit byte of final product. The gating of product bits from the B register 106 to the F register 109 is a function of the count standing in the R2 counter in register 102 and whether or not the partial product in the B register 106 is to be transferred to the parallel adder 110 with a zero shift or a left 2 shift depending on multiple selection. In what can be considered a normal case, the result of an iterative addition of a multiplicand multiple and partial product will be followed by a right 4 shift out of the parallel adder 110 to the B register 106. The next iterative addition cycle is accomplished by causing the partial product in B register 106 to be shifted left 2 bit positions to produce a net shift of 2 bit positions to the right of the partial product. This corresponds to prior art multiply schemes wherein the partial product is shifted right the number of positions equal to the number of multiplier bits utilized in the iterative addition process. After each iterative addition and shifting of the partial product, certain of the product bits will no longer enter into the multiply process. In the normal case wherein the partial product out of the adder 110 is shifted right 4 to the B register 106 and then left 2 into the parallel adder for the next iterative addition, the bit positions 66 and 67 of the B register 106 will be transferred to the proper position in the F register 109 under direction of the contents of positions 14 and 15 of the R2 counter. To be shown more fully in connection with FIGURE 9, at the time product bits are transferred from the B register 106 to the F register 109, the R2 counter will be set to a condition directing the selection of a pair of multiplier bits from the S register, 2 positions to the left with respect to the multiplier bits which actually produced the product bits being transferred to the F register 109. In other words, the pair of product bits which are to be inserted in the F register positions F6, F7 would have been generated in accordance with a multiple selection based on the R2 counter positions 14 and 15 being in the condition 11. However, at the time the two product bits are in fact transferred to the F register, the R2 counter positions 14 and 15 will have been decremented by two counts such that the gating of bits B66 and B67 will be directed to the F register positions F6 and F7 by a count in the R2 counter positions 14 and 15 of 01.

Assuming in connection with FIGURE 8, that a full 8 bits of product are accumulated in the F register 109 of FIGURE 1, without the benefit of a 0 multiple condition, a series of gates 800 through 807 will be sequentially energized by the count conditions of the R2 counter positions 14 and 15 and the B register left 2 shift condition for a $\overline{0\times}$ multiple selection from FIGURE 6 provided at AND circuits 808, 809, and 810. In this case, the product bits in B register 106 positions B66 and B77 will be sequentially gated to F register 109 positions F6 and F7, F4 and F5, F2 and F3. When the last two bits of an 8-byte of product have been generated, as indicated when the R2 counter positions 14 and 15 indicate 10, a simultaneous transfer of F register positions 2 through 7 and B66, B67 of B register 106 may be transferred to the S register 103 byte indicated by the ST counter 107. This eliminates the need for taking a slightly longer time during the fourth product bit generation to transfer bits from the B register 106 to the F register 109 and then on to the S register 103 byte.

In certain instances during the accumulation of an 8-bit byte of product in the F register 109, 0 multiple detection may have been made in which case the product bits contained in B register 106 positions B64 and B65 will not be transferred to the parallel adder 110 to take part in the iterative addition. When this case is recognized by the generation of the signal calling for a B register 0 shift from FIGURE 6, the status of the R2 counter positions 14 and 15 when combined with the command for a B register 0 shift can be utilized at AND circuits 811, 812, and 813 for causing the transfer of product bits from B register 106 positions B64–B67 to the proper bit positions of the F register 109 utilizing gates 800 through 807 and gates 814 through 817.

*Multiply cycle timing*

FIGURE 9 shows a relationship between various cycles of a multiply process and the generation of various control and transfer functions during the multiply process. During cycle #1, the R2 counter in register 102 of FIGURE 1 is set to 15 or all binary 1's. The combination of the R2 counter positions 12–13=11 and the R2 counter positions 14 and 15 being 11, causes byte #3 of the S register 103 to be examined at bit positions S30 and S31 for the purposes of selecting a multiple. As indicated previously, on the initial cycle of multiply, only a $\overline{0\times}$ multiple condition is allowed, in which case the R2 counter is decremented by 1. During the first cycle, there is no addition of a multiplicand and partial product nor is there any storage of product bits. During cycle #2, there is shown a selection of zero times multiple (0×) by the S register 103, bits S28 and S29. Because of the zero multiple selection, the R2 counter is decremented by 2. An add cycle is taken in which the contents of the B register 106 are transferred to the adder 110 with a shift of left 2 and a multiple of the multiplicand from the T register 104 as selected by S register bits 30 and 31 are added and the result shifted right 4 positions and placed in the B register 106. At the completion of the first add cycle, the first product bits will have been generated, however, the transfer of these product bits to the proper position of the F register 109 is not initiated until the following cycle. During cycle #3, a $\overline{0\times}$ multiple is shown to have been selected based on S register bits 24 and 25 in accordance with the 00 combination of R2 counter positions 14 and 15. Because of the selection of a zero multiple in cycle #2, an add cycle is taken wherein the B register 106 is transferred to the adder with a zero shift for addition to a multiplicand multiple selected in accordance with the multiplier bits contained in S register 103 positions 26 and 27. At the same time the partial product in the B register 106 is transferred to the parallel adder 110, because of the left 0 shift and the condition 00 in R2 counter positions 14 and 15, B register 106 bit positions B64 through B67 will be transferred to F register positions F4 through F7 in accordance with the logic shown in FIGURE 8. The selection of multiples, addition of multiples and partial products and stepping of the R2 counter continue until, for example, cycle #5. During cycle #5, an addition of the partial product in the B register 106 accomplished with a left 2 shift based on a $\overline{0\times}$ multiple selection in cycle #4 is taken. At the same time the add cycle is being taken, the 10 combination of R2 counter positions 14 and 15 will cause a transfer of B register positions B66 and B67 and F register positions F2–F7 to S register positions 24 through 31 in accordance with the ST counter 107 count. Thus the first 8-bit byte of final product has been transferred in the form of bit groups from the B register 106 to the F register 109 and ultimately on to a particular byte of the S register 103. The product bits which have been accumulated can be inserted in the S register 103 byte which contained the first byte of multiplier bits because the product is inserted in a byte which has been utilized for generating the product bits to be inserted. The multiply process continues until such time as the R2 counter goes to 0 indicating that 16 pairs of multiplier bits have been examined, so that no further multiple selections are required. The only item remaining is to accomplish the remaining two multiply cycles which include a final addition based the multiples selected by the last two multiplier bits followed by a cycle which causes the transfer of the final bits of product to the S register positions 0–7. The multiplication of a 32-bit multiplier and 32-bit multiplicand produces a 64-bit final product. The 32 highest order bits of the final product will be in the B register 106 and the lowest order 32 bits of the final product will be in the S register 103.

There has thus been shown a multiply algorithm which normally operates on two multiplier bits at a time but which can be accomplished at a faster rate by permitting the use of 4 multiplier bits for certain cycles such that 16 iterative additions will probably not be required to generate a 64-bit product.

*Divide algorithm*

The table of FIGURE 4 is essentially the same as the table shown in the above-identified application Serial No. 162,503 which utilizes a non-restoring type divide operation. When the dividend-remainder is in true form, a divisor multiple will be subtracted therefrom and when the dividend-remainder is in complement form, a divisor multiple will be added. The multiple of the divisor to be utilized is determined from the true or complement status of the remainder the predetermined bit combinations of the 3 high order positions of the dividend-remainder. In the present invention, it was indicated that the requirement for the storage of a three times multiple of the divisor has been eliminated. There are four situations, as depicted in the table of FIGURE 4, in which a normal iterative add cycle is taken but the results of the addition are inconclusive requiring an extra add cycle to produce a result which is conclusive. These situations arise where a three times divisor multiple would have been proper.

*Divisor multiple selection*

Figure 10:
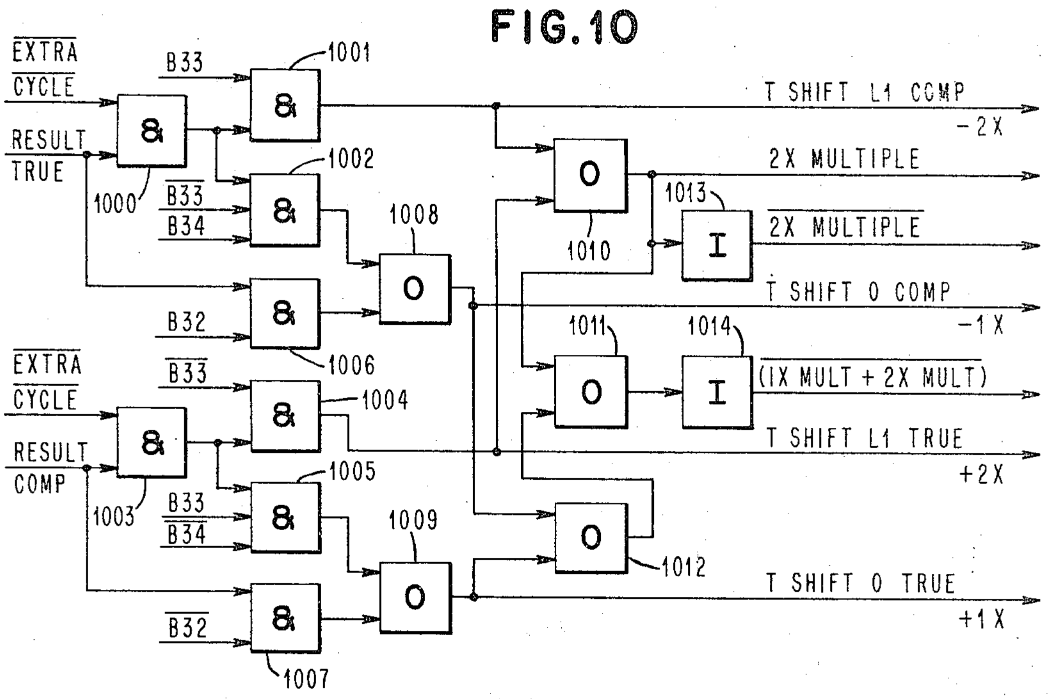
FIGURE 10 is a block diagram showing the logic required for decoding a dividend-remainder to select multiples of a divisor.

FIGURE 10 shows the logic for implementing the selection of a divisior multiple to be added to or subtracted from a dividend-remainder. The divisor contained in the T register 104 of FIGURE 1 will be transferred to the parallel adder 110 with either a 0 shift to provide a one times multiple, a 1 bit position shift to the left to provide two times multiple, accompanied with either the transfer of the divisor multiple to the adder in true form or in complement form to effect addition or subtraction.

When the dividend-remainder in the B register 106 of FIGURE 1 is in true form, AND circuits 1000, 1001, and 1002 provide all the logic required for the selection of a one or a two times multiple of the divisor for subtraction from the dividend-remainder. In a like manner, AND circuits 1003, 1004, and 1005 provide the logic required for selecting a one or two times multiple of the divisor to be added to a dividend-remainder which is in complement form. The multiple selection is made based on the binary states of the three high order bits of the dividend-remainder in B register 106 positions B32, B33 and B34. The decoding of these bits can also be made off the contents of the three high order bits in the latches 112 at the output of adder 110 in FIGURE 1. The input to AND circuits 1000 and 1003 which indicate that an extra cycle is not being taken ($\overline{\text{EXTRA}}$ $\overline{\text{CYCLE}}$) is produced in logic to be discussed which enables reduction of the logic for multiple selection in FIGURE 10.

When the requirement for an extra add cycle has been decoded, to be more fully explained in connection with the logic of FIGURE 12, AND circuits 1006 and 1007 will pick the multiple minus one times or plus one times based on a detection of a true remainder high order one (B32) or a complement remainder high order zero ($\overline{\text{B32}}$).

OR circuits 1008 and 1009 combine AND logic outputs in those situations calling for a minus or plus one times multiple of the divisor respectively. OR circuits 1010, 1011 and 1012 and inverters 1013 and 1014 combine multiple selection signals for use in other logic to be more fully explained.

*Result true-complement indication*

Figure 11:
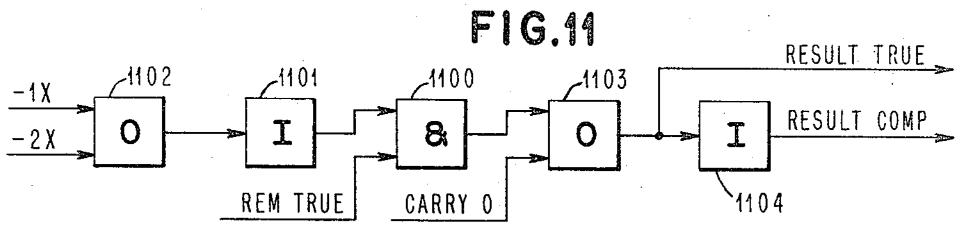
FIGURE 11 is a block diagram of the logic required for indicating the results of an addition of a divisor multiple and a dividend-remainder in accordance with the table of FIGURE 4.

The logic in FIGURE 11 is utilized for providing an indication of the true or complement status of an iterative add result. As indicated by the table of FIGURE 4, whenever the dividend-remainder result of a previous add cycle contained in the B register 106 is in true form, and neither a minus one times ($-1\times$) or minus two times ($-2\times$) multiple has been selected, an AND circuit 1100, inverter 1101 and OR circuit 1102 providing inputs to an OR circuit 1103 will indicate that the result will be true because high order bits of a dividend-remainder are binary 0's thus, in effect, each iterative cycle of a divide process is essentially only a shifting operation. In all cases, when either the previous remainder is in complement form or a minus one times or minus two times multiple has been selected, the result of the iterative cycle is entirely a function of a binary 1 carry out of position 0 of the parallel adder 110. This is the other input shown at OR circuit 1103 which provides the outputs result true or, through inverter 1104, the result complement indication.

*Extra cycle indication*

Figure 12:
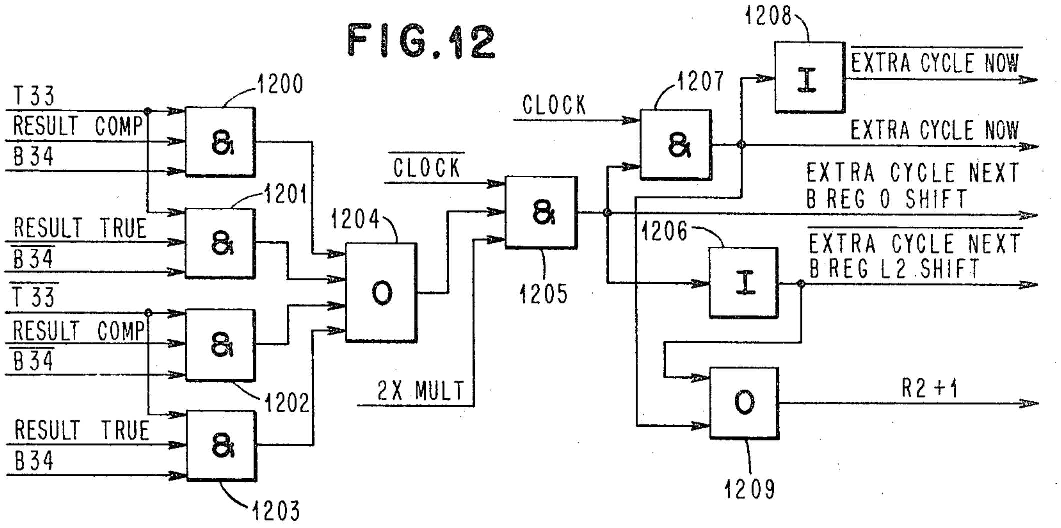
FIGURE 12 is a block diagram of the logic required for indicating when a result of a divisor and dividend-remainder addition is inconclusive requiring an extra cycle.

FIGURE 12 shows the logic required for indicating the four decoded conditions which indicate the requirement for determining whether or not an extra cycle is required for a particular iterative add cycle. AND circuits 1200 through 1203 applied to an OR circuit 1204 identify eight combinations of divisor and dividend-remainder bits. Only four of these conditions indicate the requirement for an extra cycle. The four conditions requiring an extra cycle are indicated at an AND circuit 1205 which identifies those conditions requiring selection of a two times multiple. The output of AND circuit 1205 provides a logic output which is identified as EXTRA CYCLE NEXT. The inverted output of AND circuit 1205 at inverter 1206 provides an indication that an extra cycle next is not required ($\overline{\text{EXTRA}}$ $\overline{\text{CYCLE}}$ $\overline{\text{NEXT}}$). These two outputs from AND circuit 1205 and inverter 1206 control the gating between the B register 106 and the parallel adder 110 of FIGURE 1 which, in a normal situation, always produces a left 2 shift of the dividend-remainder. However, when an extra cycle is required, the gates between the B register 106 and the parallel adder 110 are conditioned to permit a 0 shift of the dividend-remainder into the adder. An AND circuit 1207 and an inverter 1208 provide logic outputs indicating that the addition being accomplished in the adder 110 is the extra cycle addition required. Although no timing has been shown in connection with the divide algorithm, the logic in FIGURE 12 is the only logic which requires a distinction between a present cycle and a following cycle. This is indicated at AND circuits 1205 and 1207. The $\overline{\text{clock}}$ condition is positive during the second half of a particular divide cycle produced as a result of utilizing a square wave timing source which provides a clock and $\overline{\text{clock}}$ condition during the cycle. During the cycle which indicates the need for an extra cycle, the $\overline{\text{clock}}$ condition will energize AND circuit 1205 such that AND circuit 1207 will then be enabled on the next succeeding cycle when the clock condition goes positive. An OR circuit 1209 provides the necessary logic for indicating when the R2 counter of FIGURE 1 should be incremented by 1 based on whether there is no need for an $\overline{\text{EXTRA}}$ $\overline{\text{CYCLE}}$ $\overline{\text{NEXT}}$ or based on the execution of an EXTRA CYCLE NOW.

*Quotient bit generation*

Figure 13:
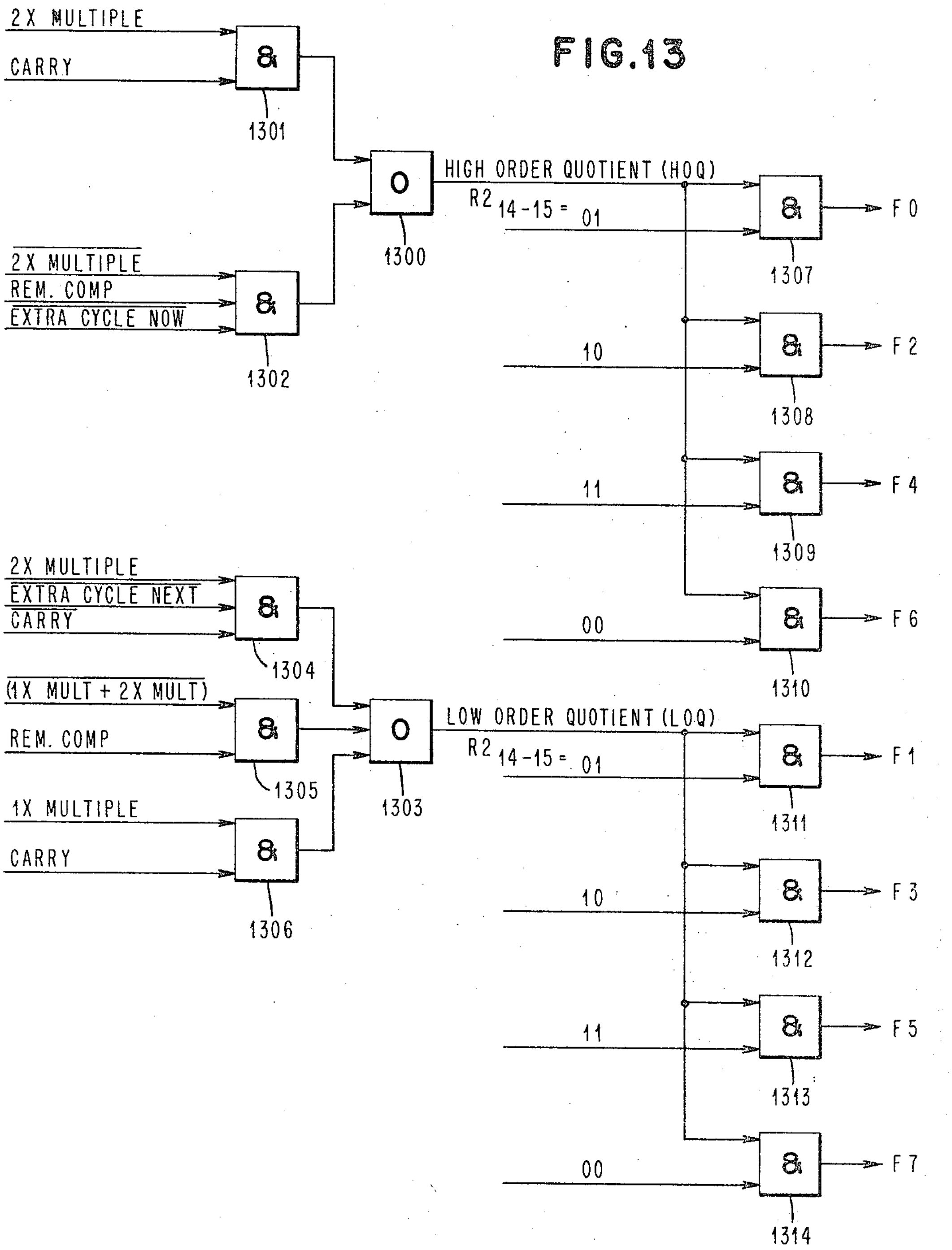
FIGURE 13 is a block diagram showing the logic required for generating a plurality of quotient bits during division for each iterative addition cycle.

The logic of FIGURE 13 is all that is required for the generation of quotient bits and can be determined from observation of the table of FIGURE 4. OR circuit 1300, AND circuit 1301 and AND circuit 1302 provide all the logic required for indicating when the high order quotient bit must be a binary 1. Whenever a two times multiple is selected, the high order quotient bit is a function of a carry out of position 0 of the parallel adder 110 of FIGURE 1. The high order quotient bit will always be a binary 1 in those cases where anything other than a two times multiple is selected with the remainder in complement form. The other input to AND circuit 1302 $\overline{\text{EXTRA}}$ $\overline{\text{CYCLE}}$ $\overline{\text{NOW}}$, prevents a change in the high order quotient bit indication during the course of the extra add cycle. OR circuit 1303, AND circuit 1304, AND circuit 1305, and AND circuit 1306 provide the logic for generating the low order quotient bit.

The gating of two quotient bits into the proper positions of the F register 109 of FIGURE 1 under control of the condition of the R2 counter positions 14 and 15 are under control of a plurality of AND circuits 1307 through 1314. As was the case in connection with multiply operations, the condition of the R2 counter will not be in step with the particular cycle of the multiple selection being made. In the divide operation, the R2 counter will be one count ahead of the storage of quotient bits. At the beginning of a divide operation, the R2 counter in register 102 of FIGURE 1 is set to 0. A 32-bit divisor is utilized such that the divide operation will be completed at the end of 16 iterative add cycles, indicated when the R2 counter goes to 15 or all binary 1's.

At the beginning of a divide operation, the R2 counter positions 14–15 of FIGURE 1 are set to 00 which causes gating out of the first byte of the S register 103, or bit positions 0–7. In a preferred embodiment of the invention, a 64-bit dividend is utilized, however, the high order 32-bits of the dividend are inserted in B register 106, and the low order 32-bits of the dividend are inserted in the S register 103. For each iterative add cycle, the binary combination of the contents of the R2 counter positions 12–15 are utilized for gating two bits of dividend, from high order to low order, from the S register 103 to the two low order bit positions of the B register 106. At the completion of four iterative add cycles, all of the dividend bits from a particular byte in the S register 103 will have been transferred to the B register 106 for utilization in following iterative add cycles. When the F register 109 has accumulated 8 bits of quotient, this 8-bit byte of quotient is then transferred to the S register 103 and inserted in the byte of the S register 103 which has just been utilized for the transferring of dividend bits to the B register 106. This byte to be gated into is indicated by the ST counter 107 which is then incremented. At the completion of the divide operation, a 32-bit quotient will have been generated and inserted into the S register 103 of FIGURE 1. A 32-bit remainder will be contained in the B register 106.

There has thus been shown in the above detailed description, a data processing system data path including a parallel adder, first and second registers, and gates for parallel shifting of operands into and out of the parallel adder. This data path permits increased efficiency in the multiply operation because in selected conditions, more multiplier bits can be utilized in an iterative add cycle than is the normal case. In a divide operation, the requirement for a storage for a three times multiple of the divisor has been eliminated. Further, no shift registers are required in the data path, nor is there a requirement for providing parity checking circuitry with each register. All parity checking of operands in the first or second register, can be accomplished at the input of the parallel adder followed by a parity checking of the adder output and adjustment of parity bit combinations due to parallel shifting of data bits out of the parallel adder.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a computer:

an adder having a plurality of stages corresponding to the orders of a multi-digit number;

a first register having a plurality of stages for storing signals representative of a first multi-digit number;

first coupling means connecting said first register to said adder for selectively generating and transferring in parallel to said adder, signals representing said first number, either to corresponding stages of said adder or to higher order stages of said adder shifted by a first predetermined number of stages;

a second register having a plurality of stages for storing signals representative of a second multi-digit number;

second coupling means connecting said second register to said adder for selectively generating and transferring in parallel to said adder, signals representing said second number, either to corresponding stages of said adder or to higher order stages of said adder shifted by a second predetermined number of stages;

mined number of stages;

third coupling means connecting the output of said adder to said first and second registers for selectively generating and transferring in parallel to said registers, signals representing the output of said adder, either to corresponding stages of said first or second registers or to higher or lower stages of said first or second register shifted by a third predetermined number of stages;

and control means, including means coupled to said first, second and third coupling means, operative to energize selected combinations of said coupling means.

2. Apparatus in accordance with claim 1 wherein said first coupling means further includes:

means, selectively operable in response to said control means, for complementing said first number during transfer to said adder.

3. Apparatus in accordance with claim 1 wherein said first, second, and third predetermined number of stages are, respectively:

one, two and four.

4. Apparatus in accordance with claim 1 wherein each of said multi-digit numbers is comprised of a plurality of digit groups, each group having an equal number of digits and an associated error detecting parity digit and wherein said adder includes means for parity checking numbers transferred to it, shifted in relation to original parity digits and for parity checking the final output of the adder, said apparatus further including:

means, operative in response to a shifting of said adder output by said third coupling means, for modifying the adder output parity digits to reflect the parity of the digits transferred to the digit groups of said first or second registers.

5. A binary multiplier which effects multiplication by repetitive addition, through a multi-stage adder, of multiples of a multiplicand contained in a first multi-stage register and a partial product contained in a second multi-stage register in response to means for sensing signals of a multiplier stored in successive groups of a predetermined number of digit stages of a third register, the signals in each group being sensed simultaneously, including in combination therewith:

first coupling means connecting the output of said adder to said second register for generating and transferring in parallel to lower order stages of said second register, signals representing a partial product;

second coupling means including first and second transfer paths connecting said second register to the input of said adder for selectively generating and transferring in parallel to said adder, signals representing said partial product, either to corresponding stages of said adder or to higher order stages of said adder;

and selection means, responsive to predetermined multiplier digits sensed by said sensing means, for enabling said first or second transfer paths.

6. A binary multiplier which effects multiplication by repetitive addition, through a multi-stage adder, of multiples of a multiplicand contained in a first multi-stage register including 0 times, 1 times, 2 times, and minus 1 times multiples and a partial product contained in a second multi-stage register in response to means for sensing signals of a multiplier stored in successive groups of two digit stages of a third register, the signals in each group being sensed simultaneously, including in combination therewith:

first coupling means connecting the output of said adder to said second register for generating and transferring in parallel to said second register, signals representing a partial product, said signals being shifted 4 stages to the right from corresponding stages in said adder;

second coupling means including first and second transfer paths connecting said second register to the input of said adder for selectively generating and transferring in parallel to said adder, signals representing said partial product, either, respectively, to corresponding stages of said adder or to stages of said adder shifted 2 stages to the left from the corresponding stages;

and selection means, responsive to predetermined multiplier digits sensed by said sensing means, for enabling said first or second transfer paths for each addition.

7. A binary multiplier in accordance with claim 6 wherein said selection means includes:

means operative in response to the selection of a 0 times multiple by said sensing means, for enabling said first transfer path and further operative to present the 2 succeeding multiplier digits to said sensing means for multiplicand multiple selection.

8. A binary multiplier in accordance with claim 6 including:

counter means for indicating the progress of the multiplication sequence and for controlling the presentation of successive 2 multiplier digits to said sensing means at the beginning of each addition cycle;

means normally stepping said counter by one for each addition cycle;

and means, operative upon selection of a 0 times multiplicand multiple for stepping said counter by two.

9. A binary divider which effects division by repetitive addition, through a multi-stage adder, of multiples of a divisor contained in a first multi-stage register and a partial dividend-remainder contained in a second multi-stage register in response to means for sensing high order digits of the dividend-remainder and the divisor, wherein during a particular quotient developing cycle a plurality of quotient digits are developed in accordance with the sensed high-order digits of the dividend-remainder and divisor and the result produced at the adder output, including in combination therewith:

first coupling means connecting the output of said adder to said second register for generating and transferring in parallel to corresponding stages of said second register, signals representing a partial dividend-remainder;

second coupling means including first and second transfer paths connecting said second register to the input of said adder for selectively generating and transferring in parallel to said adder, signals representing said dividend-remainder, either to corresponding stages of said adder or to higher order stages of said adder;

and selection means, responsive to predetermined digits sensed by said sensing means and the result of each addition, for enabling said first or second transfer paths to be used in the next addition.

10. A binary divider which effects division by repetitive addition, through a multi-stage adder, of multiples of a divisor contained in a first multi-stage register including 0 times, 1 times, 2 times, minus 1 times, and minus 2 times multiples and a partial dividend-remainder contained in a second multi-stage register in response to means for sensing three high order digits of the dividend-remainder and two high order digits of the divisor, wherein during a particular quotient developing cycle two quotient digits are developed in accordance with the sensed high-order digits of the dividend-remainder and the divisor and the result produced at the adder output, including in combination therewith:

first coupling means connecting the output of said adder to said second register for generating and transferring in parallel to corresponding stages of said second register, signals representing a partial dividend-remainder;

second coupling means including first and second transfer paths connecting said second register to the input of said adder for selectively generating and transferring in parallel to said adder, signals representing said dividend-remainder, either, respectively, to corresponding stages of said adder or to stages of said adder shifted two stages to the left from the corresponding stages;

and selection means, responsive to predetermined digits sensed by said sensing means and the result of each addition, for enabling said first or second transfer paths for each addition.

11. A binary divider in accordance with claim 10 wherein said selection means includes:

means operative at the beginning of each quotient developing cycle to invariably enable said second transfer path;

means, responsive to selection of a 2 times multiple by said sensing means, a predetermined result of the addition of the divisor multiple and dividend-remainder and said divisor digits, to provide an inconclusive result indication;

means responsive to said inconclusive result indication to enable said first transfer path;

and means, responsive to said inconclusive result indication, for initiating an extra addition cycle of said inconclusive result and a 1 times multiple of the divisor to thereby produce a conclusive result for use in generating said quotient digits.

No references cited.

MALCOLM A. MORRISON, *Primary Examiner.*

I. FAIBISCH, *Assistant Examiner.*